US012586946B2

(12) United States Patent
Nishitani

(10) Patent No.: US 12,586,946 B2
(45) Date of Patent: Mar. 24, 2026

(54) CONNECTOR WITH REDUCED HEIGHT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Akihiro Nishitani, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 290 days.

(21) Appl. No.: 18/280,421

(22) PCT Filed: Feb. 15, 2022

(86) PCT No.: PCT/JP2022/005779

§ 371 (c)(1),
(2) Date: Sep. 5, 2023

(87) PCT Pub. No.: WO2022/190780

PCT Pub. Date: Sep. 15, 2022

(65) Prior Publication Data

US 2024/0145973 A1 May 2, 2024

(30) Foreign Application Priority Data

Mar. 8, 2021 (JP) ................................ 2021-036038

(51) Int. Cl.
*H01R 13/424* (2006.01)

(52) U.S. Cl.
CPC ................................ *H01R 13/424* (2013.01)

(58) Field of Classification Search
CPC .... H01R 13/424; H01R 13/58; H01R 13/506; H01R 13/4226; H01R 13/4362; H01R 13/4637
(Continued)

(56) References Cited

U.S. PATENT DOCUMENTS 4,690,478 A 9/1987 Rahrig et al.
5,261,834 A 11/1993 Yamanashi
(Continued)

FOREIGN PATENT DOCUMENTS

JP S59-086171 A 5/1984
JP 2004-311260 A 11/2004
JP 2019-114422 A 7/2019

OTHER PUBLICATIONS

International Search Report issued on Mar. 22, 2022 for WO 2022/190780 A1 (4 pages).

*Primary Examiner* — Tho D Ta
*Assistant Examiner* — Carlos E Lopez-Pagan
(74) *Attorney, Agent, or Firm* — Venjuris, P.C.

(57) ABSTRACT

A connector is provided with a terminal fitting (10) fixed to a wire (14) and a connector housing (20) configured by assembling an outer housing (36) with an inner housing (25). The inner housing (25) is formed with a terminal accommodation chamber (21) capable of accommodating the terminal fitting (10) from a direction intersecting an arrangement direction of the terminal fitting (10) and the wire (14). The terminal accommodation chamber (21) is formed with a retaining portion (30) for restricting a displacement of the terminal fitting (10) in the terminal accommodation chamber (21) toward the wire (14). The outer housing (36) covers an opening (28) of the terminal accommodation chamber (21) in an outer surface of the inner housing (25).

7 Claims, 7 Drawing Sheets

(58) Field of Classification Search
USPC .......................................................... 439/746
See application file for complete search history.

(56) References Cited

U.S. PATENT DOCUMENTS

| | | | | |
|---|---|---|---|---|
| 6,276,964 | B1 * | 8/2001 | Shinozaki ............ | H01R 13/424 439/912 |
| 2013/0130562 | A1 | 5/2013 | Shinkawa et al. | |
| 2018/0351280 | A1 * | 12/2018 | Kosmalski ......... | H01R 13/4362 |
| 2019/0305470 | A1 * | 10/2019 | Sugimoto ............ | H01R 13/424 |
| 2020/0006888 | A1 * | 1/2020 | Kojima .................... | H02G 3/04 |
| 2020/0044379 | A1 * | 2/2020 | Miyamura ......... | H01R 13/4362 |
| 2020/0136300 | A1 * | 4/2020 | Tsukiyoshi ........... | H01R 13/424 |
| 2020/0313326 | A1 * | 10/2020 | Peterson ................ | H01R 43/02 |

* cited by examiner

CONNECTOR WITH REDUCED HEIGHT

CROSS REFERENCE TO RELATED APPLICATIONS

This application is a national phase of PCT application No. PCT/JP2022/005779, filed on 15 Feb. 2022, which claims priority from Japanese patent application No. 2021-036038, filed on 8 Mar. 2021, all of which are incorporated herein by reference.

TECHNICAL FIELD

The present disclosure relates to a connector.

BACKGROUND

Patent Document 1 discloses a connector in which a terminal fitting is inserted into a terminal accommodation chamber formed in a connector housing and retained by a flexible locking piece formed in the terminal accommodation chamber. In the process of inserting the terminal fitting into the terminal accommodation chamber, the flexible locking piece pushed by the terminal fitting is deflected in a direction intersecting an inserting direction of the terminal fitting. If the insertion of the terminal fitting is completed, the flexible locking piece resiliently returns and locks the terminal fitting.

PRIOR ART DOCUMENT

Patent Document

Patent Document 1: JP 2012-049081 A

SUMMARY OF THE INVENTION

Problems to be Solved

In the connector housing, a deflection space for the deflection of the flexible locking piece is secured in addition to an accommodation space for arranging the flexible locking piece in an undeflected state. The accommodation space and the deflection space are secured side by side in the direction intersecting the inserting direction of the terminal fitting. Thus, the above connector is enlarged in the direction intersecting the inserting direction of the terminal fitting.

A connector of the present disclosure was completed on the basis of the above situation and aims for height reduction.

Means to Solve the Problem

The present disclosure is directed to a connector with a terminal fitting fixed to a wire and a connector housing configured by assembling an outer housing with an inner housing, the inner housing being formed with a terminal accommodation chamber capable of accommodating the terminal fitting from a direction intersecting an arrangement direction of the terminal fitting and the wire, the terminal accommodation chamber being formed with a retaining portion for restricting a displacement of the terminal fitting in the terminal accommodation chamber toward the wire, and the outer housing covering an opening of the terminal accommodation chamber in an outer surface of the inner housing.

Effect of the Invention

According to the present disclosure, a height reduction can be achieved.

DETAILED DESCRIPTION TO EXECUTE THE INVENTION

Description of Embodiments of Disclosure

Figure 1:
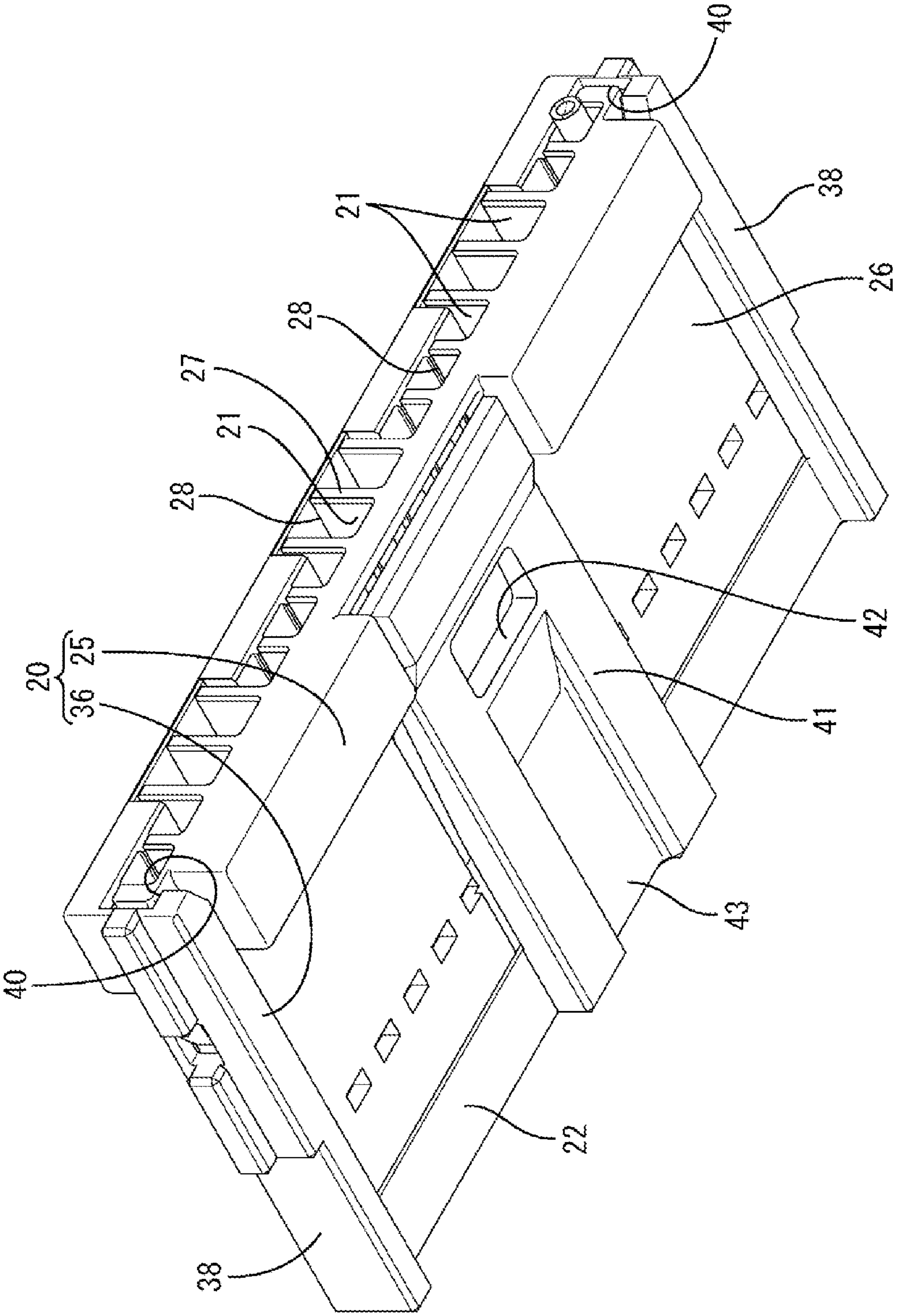
FIG. 1 is a perspective view of a connector of one embodiment when viewed obliquely from a lower-rear side.

First, embodiments of the present disclosure are listed and described.

(1) The connector of the present disclosure is provided with a terminal fitting fixed to a wire and a connector housing configured by assembling an outer housing with an inner housing, the inner housing being formed with a terminal accommodation chamber capable of accommodating the terminal fitting from a direction intersecting an arrangement direction of the terminal fitting and the wire, the terminal accommodation chamber being formed with a retaining portion for restricting a displacement of the terminal fitting in the terminal accommodation chamber toward the wire, and the outer housing covering an opening of the terminal accommodation chamber in an outer surface of the inner housing. According to this configuration, the terminal fitting accommodated in the terminal accommodation chamber is restricted from being displaced toward the wire by the retaining portion. Since the opening of the terminal accommodation chamber is covered by the outer housing, the retaining portion needs not be resiliently deformed. The connector of the present disclosure can be reduced in height in the direction intersecting the arrangement direction of the terminal fitting and the wire as compared to a connector of the type that a retaining portion is resiliently deformed.

(2) Preferably, the terminal fitting includes a rectangular tube portion, and the retaining portion is locked to the rectangular tube portion from the wire side. According to this configuration, since a displacement of the terminal fitting is restricted, utilizing the rectangular tube portion of the terminal fitting, the terminal fitting needs not be formed with a dedicated part to be locked to the retaining portion. Therefore, the complication of the shape of the terminal fitting can be avoided.

(3) Preferably, in (2), the retaining portion is inserted in the rectangular tube portion. According to this configuration, in a state where the outer housing is not closing the opening of the terminal accommodation chamber, the terminal fitting can be prevented from being displaced toward the opening and being inclined in the vertical direction with respect to the inner housing.

(4) Preferably, the inner housing includes a base plate portion and a separation wall portion projecting from the base plate portion and partitioning between adjacent ones of the terminal accommodation chambers, the outer housing includes a closing plate portion for closing the openings of the terminal accommodation chambers and a lock arm for holding the connector housing and a mating connector in a connected state, the lock arm is arranged to overlap an outer surface of the base plate portion and sandwich the inner housing between the closing plate portion and the lock arm, and a region not overlapping the lock arm, out of the base plate portion, is exposed on an outer surface of the connector housing. According to this configuration, since no plate portion constituting the outer housing is interposed between the outer surface of the base plate portion and the lock arm, a further height reduction can be realized.

(5) Preferably, in (4), the inner housing is formed with a deflection allowance space formed by recessing the outer surface of the base plate portion, and a part of the lock arm is accommodated into the deflection allowance space when the lock arm is resiliently displaced. According to this configuration, since a part of a space necessary for the resilient displacement of the lock arm is secured within a thickness range of the base plate portion, a further height reduction can be realized.

(6) Preferably, in (5), cut portions are formed by recessing parts of the base plate portion in the terminal accommodation chambers, and the base plate portion is formed with a communication portion for allowing the cut portions to communicate with the deflection allowance space. If a very thin plate portion is left in a part of the base plate portion where both the cut portions and the deflection allowance space are formed, there is a concern that the very thin plate portion is broken. According to this configuration, since the very thin plate portion is not left in the part of the base plate portion where both the cut portions and the deflection allowance space are formed, the breakage of the base plate portion can be avoided.

Details of Embodiment of Present Disclosure

Embodiment

Figure 3:
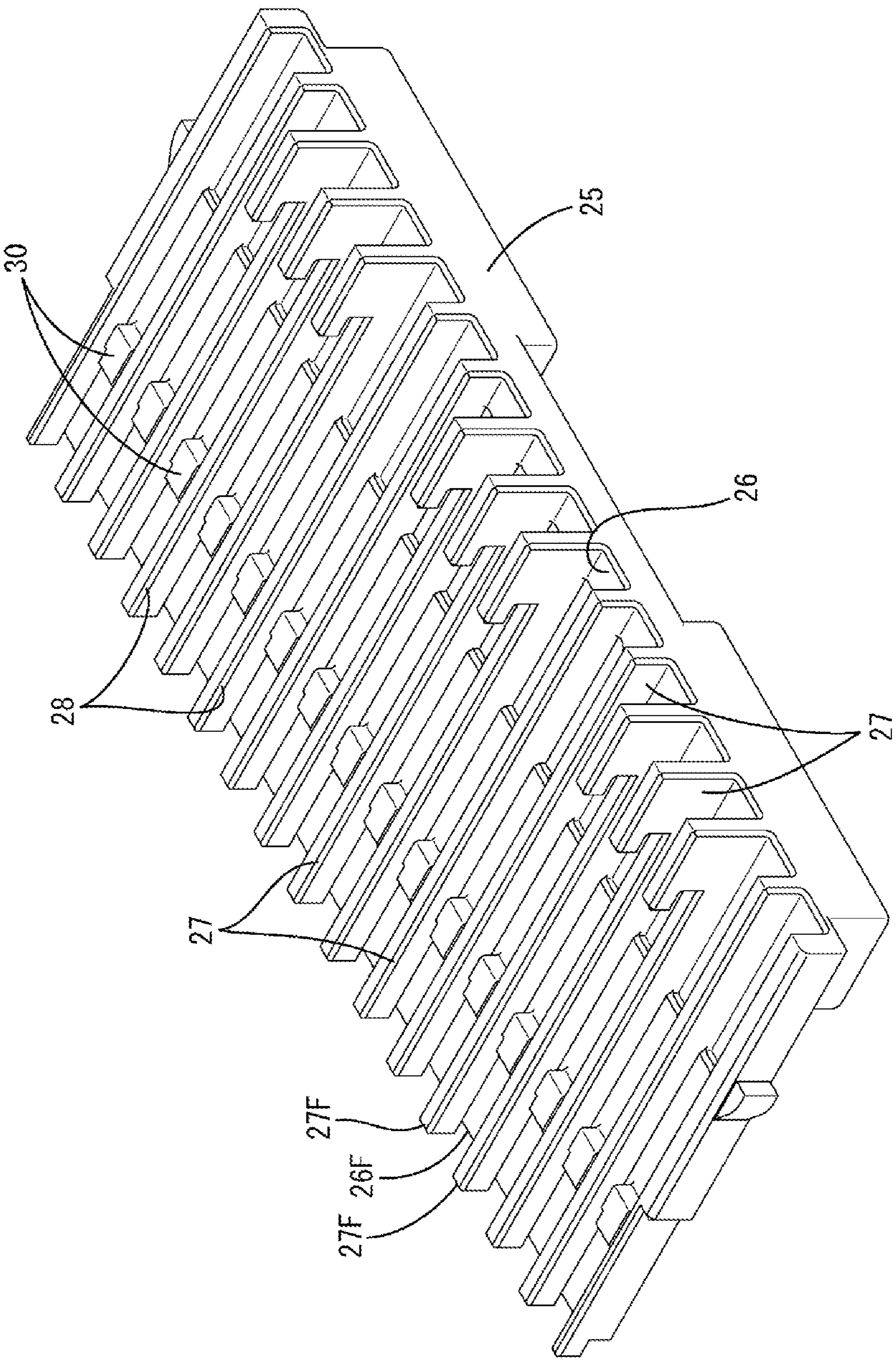
FIG. 3 is a perspective view of the inner housing when viewed obliquely from an upper-rear side.
Figure 4:
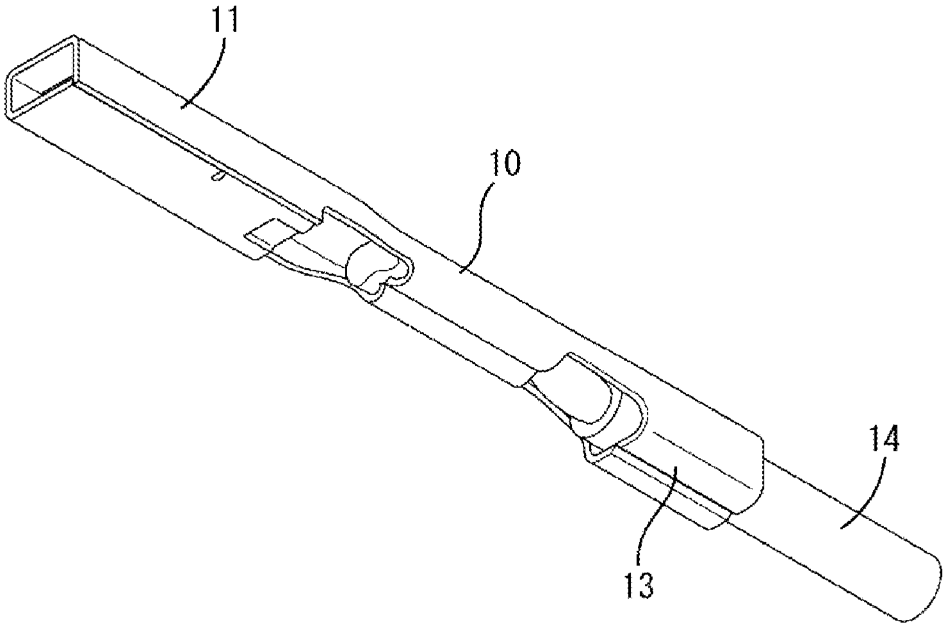
FIG. 4 is a perspective view of a terminal fitting when viewed obliquely from a lower-front side.
Figure 5:
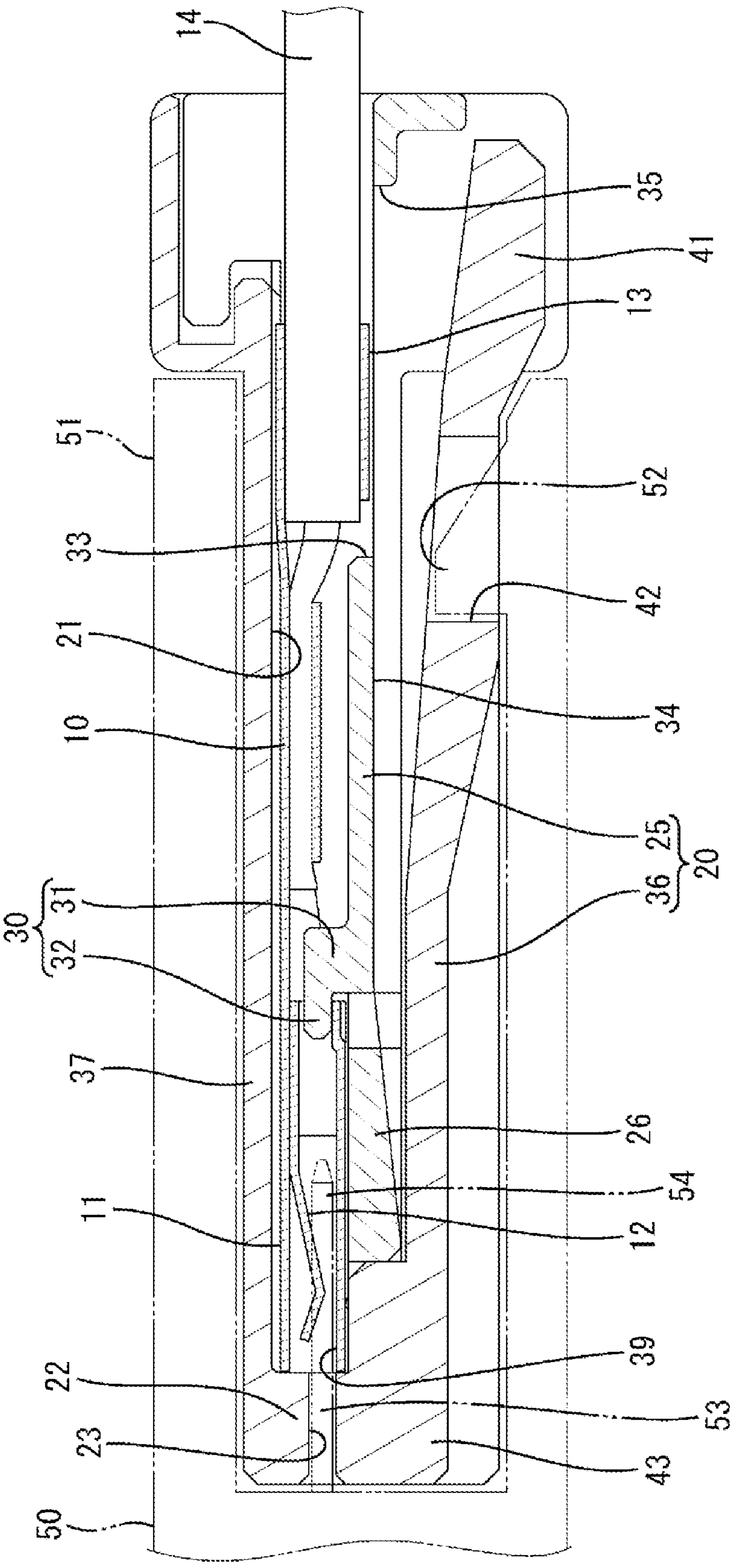
FIG. 5 is a side view in section of the connector.
Figure 6:
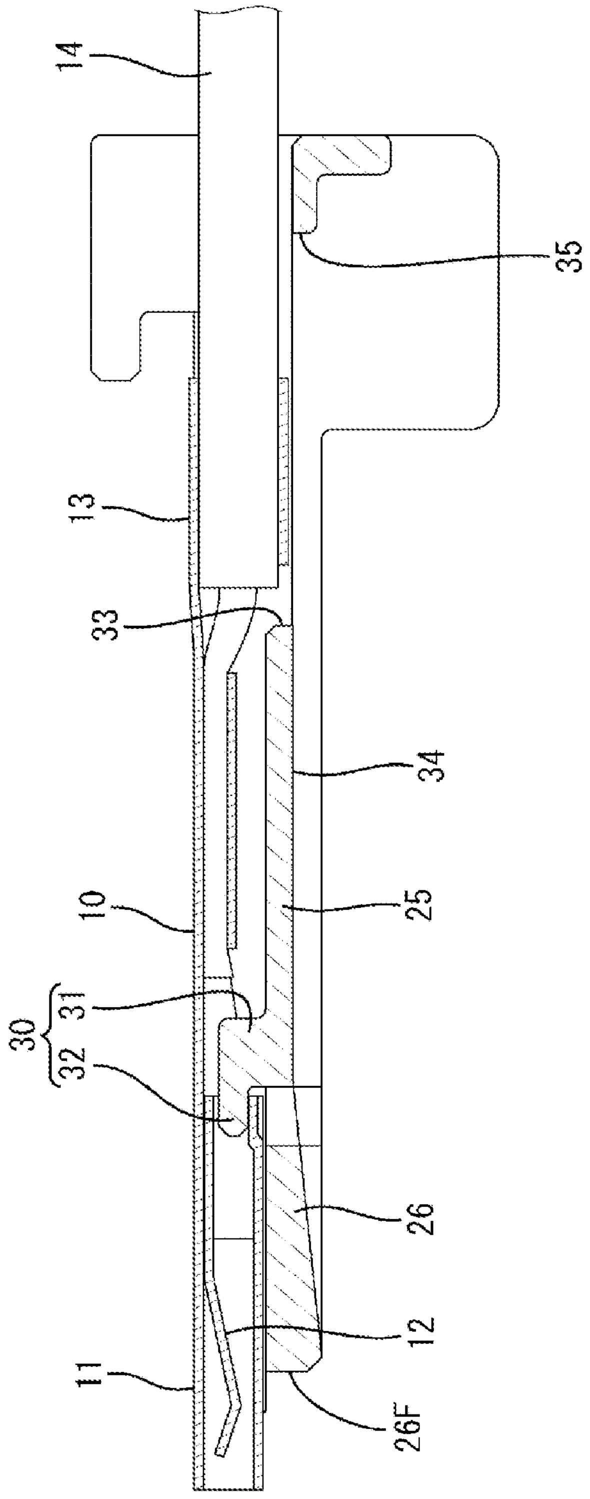
FIG. 6 is a side view in section showing a state where the terminal fitting is accommodated in the inner housing.
Figure 7:
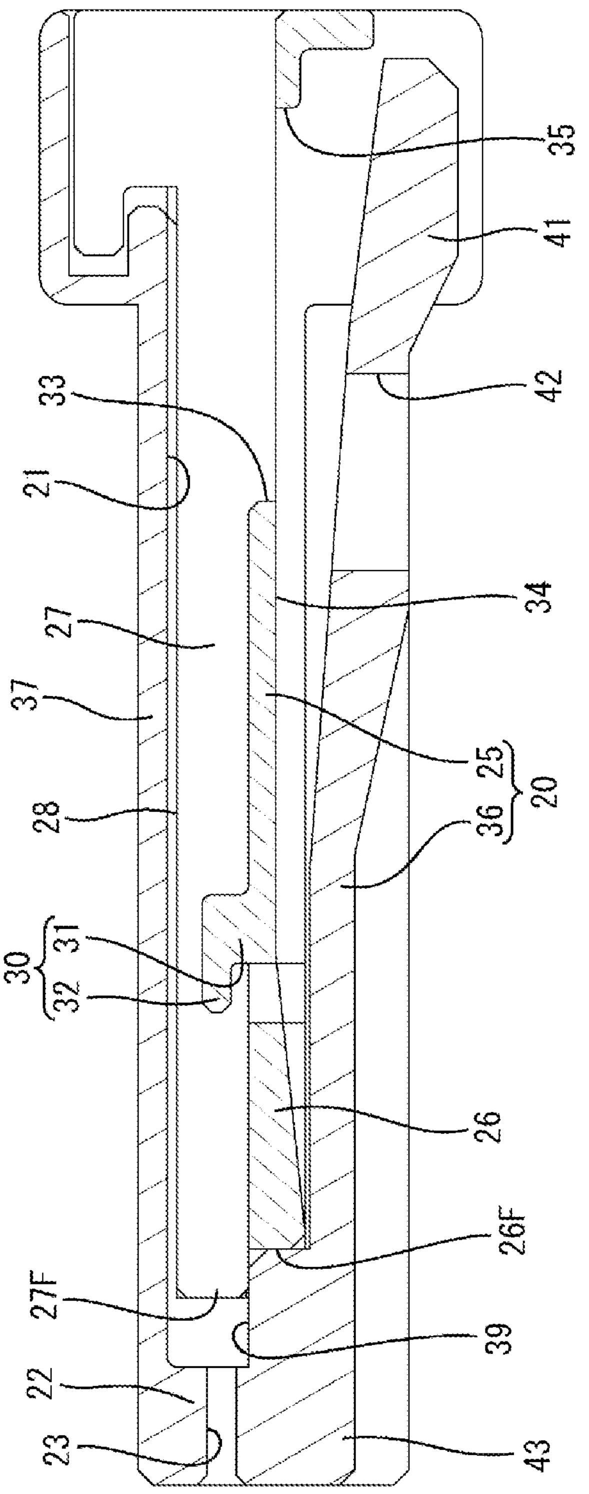
FIG. 7 is a side view in section showing a state where the inner housing and the outer housing are assembled.

One specific embodiment of a connector of the present disclosure is described below with reference to FIGS. 1 to 7. Note that the present invention is not limited to these illustrations, but is represented by claims and intended to include all changes in the scope of claims and in the meaning and scope of equivalents. In this embodiment, an oblique left-lower side in FIGS. 1 and 2, an oblique left-upper side in FIGS. 3 and 4 and a left side in FIGS. 5 to 7 are defined as a front side concerning a front-rear direction. Upper and lower sides shown in FIGS. 1 to 7 are directly defined as upper and lower sides concerning a vertical direction. The vertical direction and a height direction are used as synonyms. A lateral direction and a width direction are used as synonyms.

The connector of this embodiment is provided with a plurality of terminal fittings 10 and one connector housing 20. The terminal fitting 10 is a female terminal having a shape elongated in the front-rear direction. As shown in FIGS. 4 to 6, a rectangular tube portion 11 open on both front and rear ends is formed in a front end part of the terminal fitting 10. A resilient contact piece 12 is accommodated in the rectangular tube portion 11. A crimping portion 13 in the form of an open barrel having a larger height than the rectangular tube portion 11 is formed in a rear end part of the terminal fitting 10. The crimping portion 13 is fixed to a front end part of a wire 14. The terminal fitting 10 and the front end part of the wire 14 are arranged one behind the other. The wire 14 extends rearward from the rear end of the terminal fitting 10.

The connector housing 20 is configured by assembling an inner housing 25 made of synthetic resin and an outer housing 36 likewise made of synthetic resin. As shown in FIG. 1, the connector housing 20 has a flat rectangular parallelepiped shape as a whole. A vertical dimension of the connector housing 20 is smaller than dimensions in the front-rear direction and width direction of the connector housing 20. As shown in FIGS. 1 and 5, a plurality of terminal accommodation chambers 21 elongated in the front-rear direction are formed in the connector housing 20. The plurality of terminal accommodation chambers 21 are arranged in parallel at fixed intervals in the width direction. As shown in FIGS. 5 and 7, the connector housing 20 includes a front wall portion 22 defining the front ends of the terminal accommodation chambers 21 and partitioning between the insides of the terminal accommodation chambers 21 and the outside of the connector housing 20. The front wall portion 22 is formed with a plurality of insertion holes 23 for allowing the respective terminal accommodation chambers 21 to individually communicate with the outside of the connector housing 20.

As shown in FIG. 5, the connector housing 20 is fit into a receptacle 51 of a mating connector 50. A lock projection 52 is formed on a lower wall portion of the receptacle 51. The mating connector 50 includes male terminals 53. The male terminal 53 is connected to the terminal fitting 10. A tab 54 of the male terminal 53 is accommodated in the receptacle 51.

Figure 2:
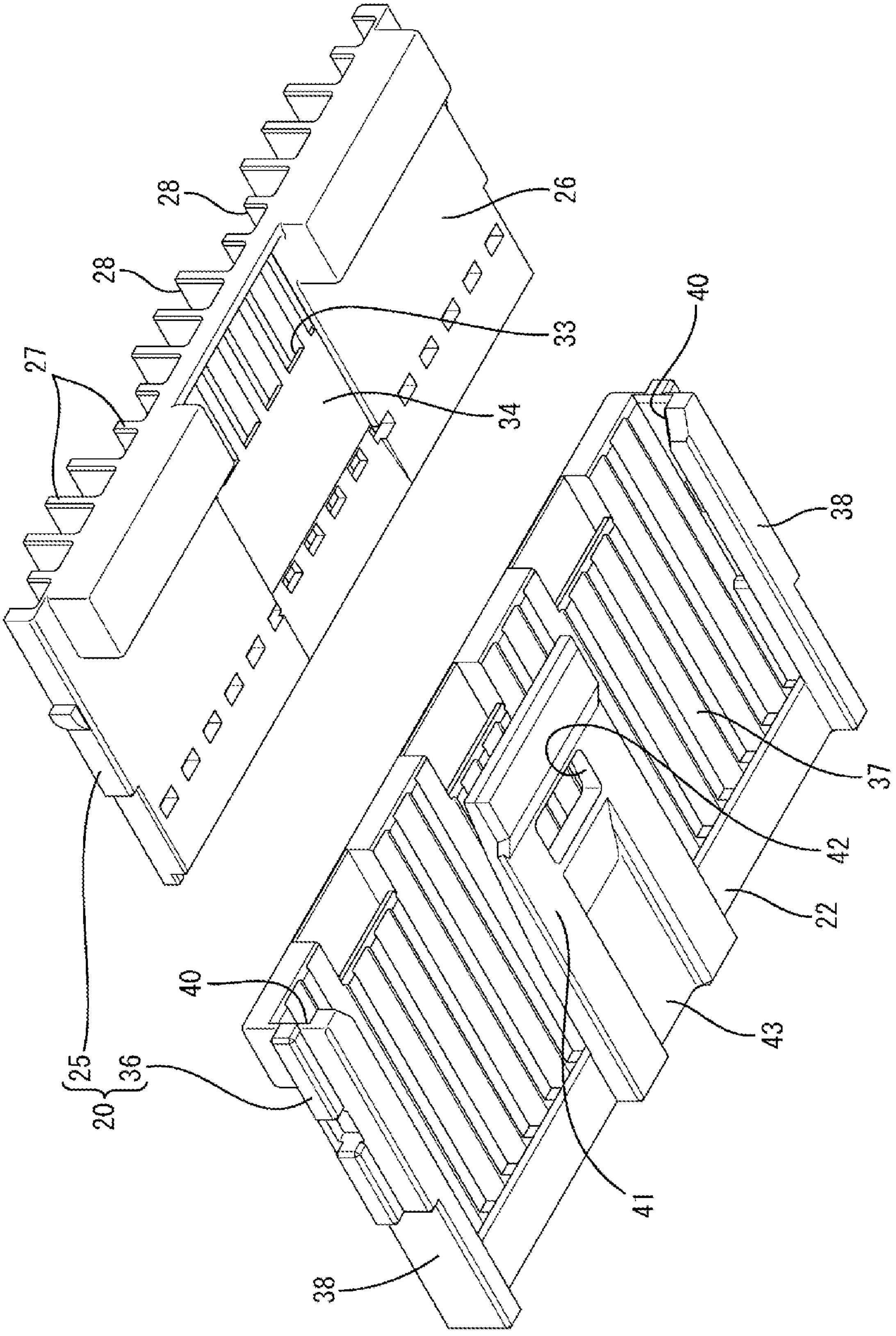
FIG. 2 is a perspective view when viewed obliquely from the lower-rear side showing a state where an inner housing and an outer housing are separated.

The inner housing 25 is a single component including a base plate portion 26 having a rectangular plan view shape when the inner housing 25 is viewed from above and a plurality of separation wall portions 27 rising from the upper surface of the base plate portion 26. The base plate portion 26 and the plurality of separation wall portions 27 constitute the plurality of terminal accommodation chambers 21. As shown in FIG. 3, the plurality of separation wall portions 27 are elongated in the front-rear direction and arranged at fixed intervals in the width direction. As shown in FIG. 7, the separation wall portion 27 partitions between the terminal accommodation chambers 21 adjacent in the width direction. A front end part 27F of the separation wall portion 27 projects further forward than a front end 26F of the base plate portion 26. As shown in FIGS. 1 to 3, a plurality of openings 28 for allowing the respective terminal accommodation chambers 21 to communicate with outside above the inner housing 25 are formed in the upper surface of the inner housing 25.

A retaining portion 30 projecting from the upper surface of the base plate portion 26 is formed in each terminal accommodation chamber 21. As shown in FIGS. 5 to 7, the retaining portion 30 includes a base portion 31 projecting in a direction perpendicular to the base plate portion 26 and an inserting portion 32 projecting forward from a projecting end part of the base portion 31. The retaining portion 30 is rigid to such an extent as not to be deflected or deformed with respect to the base plate portion 26 and the separation wall portions 27.

As shown in FIGS. 2 and 5 to 7, cut portions 33 are formed in the inner surface of the base plate portion 26, i.e.

the upper surface of the base plate portion 26 located in rear end parts of the terminal accommodation chambers 21. The inner surface of the base plate portion 26 is slightly lower in the cut portions 33. The crimping portions 13 are accommodated into the cut portions 33. A deflection allowance space 34 is formed in the outer surface of the base plate portion 26, i.e. in the outer surface of the inner housing 25. The deflection allowance space 34 is formed by shallowly recessing a widthwise central part of the outer surface of the base plate portion 26. A communication portion 35 for allowing communication between the outer surface of the base plate portion 26 and the cut portions 33 is formed in a rear end part of the deflection allowance space 34.

As shown in FIG. 2, the outer housing 36 is a single component including a closing plate portion 37, the front wall portion 22, a pair of left and right side wall portions 38 and a lock arm 41. In a plan view of the outer housing 36 from above, the closing plate portion 37 has a rectangular shape. As shown in FIG. 2, the front wall portion 22 is shaped to project downward from the front end edge of the closing plate portion 37 over an entire width. The side wall portions 38 are shaped to project downward from both left and right side edge parts of the closing plate portion 37. The lock arm 41 is a plate-like part cantilevered rearward from a widthwise central part of the front wall portion 22.

As shown in FIGS. 5 and 7, a recess 39 communicating with the insertion holes 23 is formed in the rear surface of the front wall portion 22. As shown in FIGS. 1 and 2, guide grooves 40 extending in the front-rear direction are formed in the inner side surfaces of the side wall portions 38. The lock arm 41 is formed with a lock hole 42. The lock arm 41 can be resiliently displaced in the vertical direction toward and away from the closing plate portion 37 with a supporting portion 43 connected to the front wall portion 22 as a fulcrum.

Next, an assembling procedure of the connector is described. First, the terminal fittings 10 are accommodated into the terminal accommodation chambers 21 through the openings 28 in the upper surface of the inner housing 25. A mounting direction of the terminal fitting 10 into the terminal accommodation chamber 21 is a direction intersecting perpendicular to the front-rear direction, in which the terminal fitting 10 and the wire 14 are arranged, i.e. a length direction of the terminal fitting 10. If the terminal fitting 10 accommodated into the terminal accommodation chamber 21 is slid rearward, the inserting portion 32 of the retaining portion 30 is inserted into a rear end part of the rectangular tube portion 11 and the base portion 31 is locked to the rear end edge of the rectangular tube portion 11 from behind. By this locking, the terminal fitting 10 is restricted from relatively moving rearward, i.e. toward the wire 14, with respect to the inner housing 25.

By the insertion of the inserting portion 32 into the rectangular tube portion 11, the terminal fitting 10 is restricted from being relatively displaced upward with respect to the inner housing 25. In the above way, the terminal fitting 10 is held positioned in the terminal accommodation chamber 21. A front end part of the rectangular tube portion 11 projects further forward than the front end edge of the base plate portion 26. Since being located below the lower surface of the rectangular tube portion 11, a lower end part of the crimping portion 13 is accommodated into the cut portion 33. The crimping portion 13 is exposed on the outer surface of the inner housing 25 in the communication portion 35.

After the terminal fittings 10 are mounted into the inner housing 25, the outer housing 36 and the inner housing 25 are assembled to configure the connector housing 20. When the inner housing 25 and the outer housing 36 are assembled, both left and right side edge parts of the inner housing 25 are fit into the guide grooves 40 from behind the outer housing 36 and slid. The outer housing 36 is assembled while being vertically sandwiched between the closing plate portion 37 and the lock arm 41.

With the inner housing 25 and the outer housing 36 assembled, all the openings 28 of the inner housing 25 are closed by the closing plate portion 37, the terminal accommodation chambers 21 are defined over the entire peripheries and the terminal fittings 10 are held accommodated in the terminal accommodation chambers 21. The front end parts of the rectangular tube portions 11 of the terminal fittings 10 and those of the separation wall portions 27 are fit into the recess 39 of the front wall portion 22 of the outer housing 36. The wires 14 are led out rearward from the connector housing 20.

The lock arm 41 is arranged to overlap the outer surface of the base plate portion 26. The lock arm 41 is arranged to cover the deflection allowance space 34 in the front-rear direction and lateral direction. The communication portion 35 is also covered by the lock arm 41. Out of the outer surface of the base plate portion 26, regions not overlapping the lock arm 41 and side edge regions not to be fit into the guide grooves 40 are exposed on the outer surface of the connector housing 20. In the above way, the assembling of the connector housing 20, the mounting of the terminal fittings 10 into the connector housing 20 and the manufacturing of the connector are completed.

In connecting the connector to the mating connector 50, the connector housing 20 is fit into the receptacle 51 of the mating connector 50. In the process of fitting the connector housing 20 and the receptacle 51, the lock arm 41 is resiliently displaced in a direction approaching the base plate portion 26 due to interference with the lock projection 52. At this time, a part of the lock arm 41 enters the deflection allowance space 34. When the connector housing 20 and the receptacle 51 are properly fit, the lock arm 41 resiliently returns and the lock hole 42 and the lock projection 52 are fit. By the fitting of the lock hole 42 and the lock projection 52, the connector housing 20 and the mating connector 50 are locked in the connected state.

The connector of this embodiment is provided with the terminal fittings 10 fixed to the wires 14 and the connector housing 20. The connector housing 20 is configured by assembling the outer housing 36 with the inner housing 25. The inner housing 25 is formed with the terminal accommodation chambers 21. The terminal fitting 10 is accommodated into the terminal accommodation chamber 21 from the direction intersecting the front-rear direction, which is an arrangement direction of the terminal fitting 10 and the wire 14, (from above). The retaining portion 30 is formed in the terminal accommodation chamber 21. The retaining portion 30 restricts the terminal fitting 10 in the terminal accommodation chamber 21 from being displaced toward the wire 14, i.e. rearward. The outer housing 36 covers the openings 28 of the terminal accommodation chambers 21 in the outer surface of the inner housing 25.

According to this configuration, the terminal fitting 10 accommodated into the terminal accommodation chamber 21 is restricted from being displaced toward the wire 14 by the retaining portion 30. Since the openings 28 of the terminal accommodation chambers 21 are covered by the outer housing 36, the retaining portions 30 need not be resiliently deformed. The connector of this embodiment can be reduced in height in the vertical direction, which is the direction intersecting the arrangement direction of the terminal fitting 10 and the wire 14, as compared to a connector of the type that a retaining portion is resiliently deformed.

The terminal fitting 10 includes the rectangular tube portion 11. The retaining portion 30 is locked to the rectangular tube portion 11 from the side of the wire 14. Since a displacement of the terminal fitting 10 is restricted, utilizing the rectangular tube portion 11 of the terminal fitting 10, the terminal fitting 10 needs not be formed with a dedicated part to be locked to the retaining portion 30. Therefore, the complication of the shape of the terminal fitting 10 can be avoided.

The inserting portion 32 of the retaining portion 30 is inserted into the rectangular tube portion 11 from behind. According to this configuration, in a state where the outer housing 36 is not closing the openings 28 of the terminal accommodation chambers 21, i.e. in a state where the outer housing 36 is not assembled with the inner housing 25, the terminal fitting 10 can be prevented from being displaced toward the opening 28 and coming out from the terminal accommodation chamber 21. Further, the terminal fitting 10 can also be prevented from being inclined in the vertical direction with respect to the inner housing 25.

The inner housing 25 includes the base plate portion 26 and the separation wall portions 27 projecting from the base plate portion 26 and partitioning between adjacent ones of the terminal accommodation chambers 21. The outer housing 36 includes the closing plate portion 37 for closing the openings 28 of the terminal accommodation chambers 21 and the lock arm 41 for holding the connector housing 20 and the mating connector 50 in the connected state. The lock arm 41 is arranged to overlap the outer surface of the base plate portion 26 and sandwich the inner housing 25 between the closing plate portion 37 and the lock arm 41. Out of the base plate portion 26, regions not overlapping the lock arm 41 are exposed on the outer surface of the connector housing 20. According to this configuration, since no plate portion constituting the outer housing 36 is interposed between the outer surface of the base plate portion 26 and the lock arm 41, a further height reduction can be realized.

The inner housing 25 is formed with the deflection allowance space 34 shaped by recessing the outer surface of the base plate portion 26. When the lock arm 41 is resiliently displaced, a part of the lock arm 41 is accommodated into the deflection allowance space 34. According to this configuration, since a part of a space necessary for the resilient displacement of the lock arm 41 is secured within a thickness range of the base plate portion 26, a further height reduction can be realized.

The terminal accommodation chamber 21 is formed with the cut portion 33 by recessing a part of the base plate portion 26. The base plate portion 26 is formed with the communication portion 35 for allowing the cut portions 33 to communicate with the deflection allowance space 34. If a very thin plate portion is left in a part of the base plate portion 26 where both the cut portions 33 and the deflection allowance space 34 are formed, there is a concern that the very thin plate portion is broken. According to the above configuration, since the very thin plate is not left in the part of the base plate portion 26 where both the cut portions 33 and the deflection allowance space 34 are formed, the breakage of the base plate portion 26 can be avoided.

Other Embodiments

The present invention is not limited to the above described and illustrated embodiment, but is represented by claims. The present invention includes all changes in the scope of claims and in the meaning and scope of equivalents and also includes the following embodiments.

Although the retaining portion is locked to the rectangular tube portion in the above embodiment, the retaining portion may be locked to a part other than the rectangular tube portion, out of the terminal fitting.

Although the retaining portion is inserted into the rectangular tube portion in the above embodiment, the retaining portion may not be inserted into the rectangular tube portion.

Although the lock arm is arranged to sandwich the inner housing between the closing plate portion and the lock arm in the above embodiment, the lock arm may be arranged along the outer surface of the closing plate portion.

Although the base plate portion of the inner housing is partially exposed on the outer surface of the connector housing in the above embodiment, the entire base plate portion may be covered by the outer housing.

Although the deflection allowance space is formed in the outer surface of the base plate portion in the above embodiment, the deflection allowance space may not be formed in the outer surface of the base plate portion.

Although the cut portions of the terminal accommodation chambers and the deflection allowance space communicate in the above embodiment, the cut portions and the deflection allowance space may not communicate.

LIST OF REFERENCE NUMERALS

10 . . . terminal fitting
11 . . . rectangular tube portion
12 . . . resilient contact piece
13 . . . crimping portion
14 . . . wire
20 . . . connector housing
21 . . . terminal accommodation chamber
22 . . . front wall portion
23 . . . insertion hole
25 . . . inner housing
26 . . . base plate portion
26F . . . front end of base plate portion
27 . . . separation wall portion
27F . . . front end part of separation wall portion
28 . . . opening
30 . . . retaining portion
31 . . . base portion
32 . . . inserting portion
33 . . . cut portion
34 . . . deflection allowance space
35 . . . communication portion
36 . . . outer housing
37 . . . closing plate portion
38 . . . side wall portion
39 . . . recess
40 . . . guide groove
41 . . . lock arm
42 . . . lock hole
43 . . . supporting portion
50 . . . mating connector
51 . . . receptacle
52 . . . lock projection
53 . . . male terminal
54 . . . tab

What is claimed is:

1. A connector, comprising:

a terminal fitting fixed to a wire; and a connector housing configured by assembling an outer housing with an inner housing, the inner housing being formed with a plurality of terminal accommodation chambers each capable of accommodating the terminal fitting from a direction intersecting an arrangement direction of the terminal fitting and the wire, the terminal accommodation chambers each being formed with a retaining portion for restricting a displacement of the terminal fitting in each terminal accommodation chamber toward the wire, and the outer housing covering openings of the terminal accommodation chambers in an outer surface of the inner housing, wherein the inner housing includes a base plate portion and a separation wall portion projecting from the base plate portion and partitioning between adjacent ones of the terminal accommodation chambers, the outer housing includes a closing plate portion for closing the openings of the terminal accommodation chambers and a lock arm for holding the connector housing and a mating connector in a connected state, the lock arm is arranged to overlap an outer surface of the base plate portion and sandwich the inner housing between the closing plate portion and the lock arm, and a region not overlapping the lock arm, out of the base plate portion, is exposed on an outer surface of the connector housing.

2. The connector of claim 1, wherein:

the lock arm is cantilevered rearward from a front wall portion of the connector housing and resiliently displaceable toward and away from the closing plate portion of the outer housing, and the separation wall portion is disposed in a gap defined between the closing plate portion and the lock arm.

3. The connector of claim 1, wherein:

the lock arm contacts a lower surface of the base plate portion opposite to an upper surface of the base plate portion facing the closing plate portion, and a region not overlapping the lock arm, out of the lower surface of the base plate portion, is exposed on the outer surface of the connector housing.

4. The connector of claim 1, wherein:

the terminal fitting includes a rectangular tube portion, and the retaining portion is locked to the rectangular tube portion from the wire side.

5. The connector of claim 4, wherein the retaining portion is inserted in the rectangular tube portion.

6. The connector of claim 1, wherein:

the inner housing is formed with a deflection allowance space formed by recessing the outer surface of the base plate portion, and a part of the lock arm is accommodated into the deflection allowance space when the lock arm is resiliently displaced.

7. The connector of claim 6, wherein:

cut portions are formed by recessing parts of the base plate portion in the terminal accommodation chambers, and the base plate portion is formed with a communication portion for allowing the cut portions to communicate with the deflection allowance space.

* * * * *